United States Patent
Yamazaki

(10) Patent No.: US 6,690,487 B1
(45) Date of Patent: Feb. 10, 2004

(54) METHOD AND APPARATUS FOR IMAGE PROCESSING

(75) Inventor: Yoshirou Yamazaki, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/377,822

(22) Filed: Aug. 20, 1999

(30) Foreign Application Priority Data

Aug. 20, 1998 (JP) .......................................... 10-233754

(51) Int. Cl.$^7$ .............................................. G06F 15/00
(52) U.S. Cl. ........................................ 358/1.9; 358/518
(58) Field of Search .................... 358/1.9, 518, 504, 358/519; 382/167, 173, 162, 276, 282, 300, 247, 248

(56) References Cited

U.S. PATENT DOCUMENTS

| | | | | |
|---|---|---|---|---|
| 4,963,925 A | * | 10/1990 | Miyazaki .................. 355/77 |
| 5,289,295 A | * | 2/1994 | Yumiba et al. ............. 358/518 |
| 5,521,723 A | * | 5/1996 | Madden et al. ............. 358/501 |
| 5,724,442 A | * | 3/1998 | Ogatsu et al. ............. 382/167 |
| 5,781,315 A | * | 7/1998 | Yamaguchi ................ 358/520 |
| 5,875,021 A | * | 2/1999 | Yamaguchi ................. 355/35 |
| 5,974,173 A | * | 10/1999 | Kimura .................... 382/167 |
| 5,987,167 A | * | 11/1999 | Inoue ..................... 382/167 |
| 6,014,457 A | * | 1/2000 | Kubo et al. ............... 382/167 |
| 6,041,136 A | * | 3/2000 | Ohga ...................... 382/162 |
| 6,072,464 A | * | 6/2000 | Ozeki ..................... 345/603 |
| 6,101,272 A | * | 8/2000 | Noguchi ................... 382/167 |
| 6,130,675 A | * | 10/2000 | Murai et al. .............. 345/600 |
| 6,148,323 A | * | 11/2000 | Whitner et al. ............ 709/105 |
| 6,151,135 A | * | 11/2000 | Tanaka et al. ............. 358/1.9 |
| 6,151,136 A | * | 11/2000 | Takemoto .................. 358/1.9 |
| 6,229,916 B1 | * | 5/2001 | Ohkubo .................... 382/167 |
| 6,262,817 B1 | * | 7/2001 | Sato et al. ............... 358/518 |
| 6,278,800 B1 | * | 8/2001 | Madden et al. ............. 382/167 |
| 6,335,734 B1 | * | 1/2002 | Nagae et al. .............. 345/589 |
| 6,411,304 B1 | * | 6/2002 | Semba et al. .............. 345/590 |

* cited by examiner

*Primary Examiner*—Mark Wallerson
(74) *Attorney, Agent, or Firm*—Birch, Stewart, Kolasch & Birch, LLP

(57) ABSTRACT

The image processing method and apparatus perform nonlinear transformation on a digital color signal to obtain a nonlinear transformed signal, optionally perform LUT transformation on the digital color signal or the nonlinear transformed signal to obtain a LUT transformed signal, compute a chroma of the digital color signal from the digital color signal or the nonlinear transformed signal, compute a chroma weight coefficient based on the computed chroma and perform arithmetic operations for weighting the nonlinear transformed signal and the digital color signal or the LUT transformed signal with the chroma weight coefficient, thereby obtaining an output signal. In these method and apparatus, secondary matrix operations are performed on the color reproduction area taken as a whole, but the secondary matrix operation are not performed or LUT operations are performed on "gray" taken as a separate entity, thereby ensuring that the desired color reproduction can be performed consistently without causing subtle variations in "gray" signals.

18 Claims, 8 Drawing Sheets

METHOD AND APPARATUS FOR IMAGE PROCESSING

BACKGROUND OF THE INVENTION

This invention relates to an apparatus and a method for image processing, particularly ones that are useful in reading the images on photographic films (which are hereinafter referred to simply as "films") to produce photographic prints of high quality in succession.

Heretofore, the images recorded on films such as negatives and reversals have been commonly printed on light-sensitive materials (photographic paper) by means of direct (analog) exposure in which the film image is projected onto the light-sensitive material to achieve its areal exposure.

A new technology has recently been introduced and this is a printer that relies upon digital exposure. Briefly, the image recorded on a film is read photoelectrically, converted to digital signals and subjected to various image processing operations to produce image data for recording purposes; recording light that has been modulated in accordance with the image data is used to scan and expose a light-sensitive material to record a latent image, which is subsequently developed to produce a finished print. The printer operating on this principle has been commercialized as a digital printer.

In the digital printer, images can be processed as digital image data to determine the exposure conditions for printing. Hence, it is capable of performing various image processing operations such as the correction of washed-out highlights or flat (dull) shadows due to the taking of pictures with backlight or an electronic flash, sharpening and the correction of color or density failures and this enables the production of prints of the high quality that has been impossible to achieve by the conventional direct exposure. Further, not only the assembling of images and the splitting of a single image into plural images but also the composition of characters can be performed by processing the image data and, as a result, prints can be outputted after various editing and/or processing operations have been performed in accordance with specific uses.

Outputting images as prints is not the sole capability of the digital printer; the image data can be supplied into a computer and the like and stored in recording media such as a floppy disk; hence, the image data can be put to various non-photographic uses.

Having these features, the digital printer is basically composed of an image input unit having a scanner (image reading apparatus) and an image processing apparatus, and an image output unit having a printer (image recording apparatus) and a processor (developer).

In the scanner, reading light issuing from a light source is allowed to be incident on a film, from which projected light bearing the image recorded on the film is produced and focused by an imaging lens to form a sharp image on an image sensor such as a CCD sensor; the image is then captured by photoelectric conversion and sent to the image processing apparatus as data for the image on the film (as image data signals) after being optionally subjected to various image processing schemes.

In the image processing apparatus, image processing conditions are set on the basis of the image data captured with the scanner and image processing as determined by the thus set conditions is performed on the captured image data and the resulting output image data for image recording (i.e., exposure conditions) are sent to the printer.

In the printer, if it is of a type that relies upon exposure by scanning with an optical beam, the latter is modulated in accordance with the image data from the image processing apparatus and deflected in a main scanning direction as the light-sensitive material is transported in an auxiliary scanning direction perpendicular to the main scanning direction, whereby a latent image is formed as the result of exposure (printing) of the light-sensitive material with the image bearing optical beam. Then, in the processor, development and other processing as determined by the light-sensitive material are performed to produce a print reproducing the image that was recorded on the film.

The image processing schemes described above generally include color balance adjustment, contrast correction (toning), lightness correction, dodging (compression/extension of the dynamic range of densities), chroma correction and sharpening. These schemes are performed by known methods comprising appropriate combinations of arithmetic operations with operation expressions, processing with look-up tables (LUTs), matrix (MTX) operations, processing with filters and the like. For example, color balance adjustment, lightness correction and contrast correction are performed with LUTs and chroma correction is performed by MTX operations. Sharpening and dodging are performed in other processing units.

In the conventional image processing technology, color signals are uniformly processed with a set of matrix coefficients. However, a problem with such uniform processing is that "gray" signals vary subtly to cause variations in color tints. If the color signal space is divided into a plurality of regions which are to be processed with different matrices, several processing problems occur; first, the respective matrices have to be calculated; second, the boundaries of the individual regions must be connected smoothly; third, even gray has to be corrected with matrices.

SUMMARY OF THE INVENTION

The present invention has been accomplished under these circumstances and has as an object providing an image processing method in which secondary matrix operations are performed on the color reproduction area taken as a whole but in which the secondary matrix operations are not performed or LUT operations are performed on "gray" taken as a separate entity, thereby ensuring that the desired color reproduction can be performed consistently without causing subtle variations in "gray" signals. Another object of the present invention is to provide an image processing apparatus for implementing the above method. The stated object of the invention can be attained by an image processing method comprising the steps of: performing nonlinear transformation on a digital color signal to obtain a nonlinear transformed signal; computing a chroma of the digital color signal from the digital color signal or the nonlinear transformed signal; computing a chroma weight coefficient based on the computed chroma; and performing arithmetic operations for weighting the nonlinear transformed signal and the digital color signal with the chroma weight coefficient, thereby obtaining an output signal.

Preferably, the image processing method of the present invention further includes the steps of: computing a lightness of the digital color signal from the digital color signal or the nonlinear transformed signal; computing a lightness weight coefficient based on the computed lightness; combining the lightness weight coefficient and the chroma weight coefficient to compute a single coordinated weight coefficient; and performing arithmetic operations for weighting the nonlinear transformed signal and the digital color signal with the coordinated weight coefficient, thereby obtaining the output signal.

Preferably, in order to determine the coordinated weight coefficient, a sum or product of the two weight coefficients including the lightness weight coefficient and the chroma weight coefficient is computed and limiting is performed such that the coordinated weight coefficient takes a value within a specified range.

The nonlinear transformation is preferably a secondary matrix or a three-dimensional LUT.

The stated object of the invention can be attained by an image processing method comprising the steps of: performing nonlinear transformation on a digital color signal to obtain a nonlinear transformed signal; performing LUT transformation on the digital color signal or the nonlinear transformed signal to obtain a LUT transformed signal; computing a chroma of the digital color signal from the digital color signal or the nonlinear transformed signal; computing a chroma weight coefficient based on the computed chroma; and performing arithmetic operations for weighting the nonlinear transformed signal and the LUT transformed signal with the chroma weight coefficient, thereby obtaining an output signal.

Preferably, the image processing method of the invention further includes the steps of: computing a lightness of the digital color signal from the digital color signal or the nonlinear transformed signal; computing a lightness weight coefficient based on the computed lightness; combining the lightness weight coefficient and the chroma weight coefficient to compute a single coordinated weight coefficient; and performing arithmetic operations for weighting the nonlinear transformed signal and the LUT transformed signal with the coordinated weight coefficient, thereby obtaining the output signal.

Preferably, in order to determine the coordinated weight coefficient, a sum or product of the two weight coefficients including the lightness weight coefficient and the chroma weight coefficient is computed and limiting is performed such that the coordinated weight coefficient takes a value within a specified range.

The nonlinear transformation is preferably a secondary matrix or a three-dimensional LUT.

The stated object of the invention can be attained by an image processing apparatus comprising: nonlinear transforming means for performing nonlinear transformation on a digital color signal; chroma computing means for computing a chroma of the digital color signal; chroma weight computing means for computing a chroma weight coefficient based on the chroma computed by the chroma computing means; and weighting arithmetic means for weighting a nonlinear transformed signal output from the nonlinear transforming means and the digital color signal with the chroma weight coefficient computed by the chroma weight computing means, thereby obtaining an output signal.

Preferably, the image processing apparatus of the invention further includes: lightness computing means for computing a lightness of the digital color signal; lightness weight computing means for computing a lightness weight coefficient based on the lightness computed by the lightness computing means; and weight coordinating means by which the chroma weight coefficient computed by the chroma weight computing means and the lightness weight coefficient computed by the lightness weight computing means are combined to compute a single coordinated weight coefficient, wherein the weighting arithmetic means performs arithmetic operations for weighting the nonlinear transformed signal output from the nonlinear transforming means and the digital color signal with the coordinated weight coefficient computed by the weight coordinating means.

Preferably, the image processing apparatus of the invention further includes: LUT transforming means for performing LUT transformation on the digital color signal, wherein the weighting arithmetic means performs arithmetic operations for weighting the nonlinear transformed signal output from the nonlinear transforming means and a LUT transformed signal output from the LUT transforming means with the chroma weight coefficient computed by the chroma weight computing means.

Preferably, the image processing apparatus of the invention further includes: lightness computing means for computing a lightness of the digital color signal; lightness weight computing means for computing a lightness weight coefficient based on the lightness computed by the lightness computing means; and weight coordinating means by which the chroma weight coefficient computed by the chroma weight computing means and the lightness weight coefficient computed by the lightness weight computing means are combined to compute a single coordinated weight coefficient, wherein the weighting arithmetic means performs arithmetic operations for weighting the nonlinear transformed signal output from the nonlinear transforming means and the LUT transformed signal output from the LUT transforming means with the coordinated weight coefficient computed by the weight coordinating means.

The nonlinear transforming means is preferably a secondary matrix or a three-dimensional LUT.

Preferably, the chroma computing means is selectively supplied with either the nonlinear transformed signal from the nonlinear transforming means or the digital color signal.

Preferably, the lightness computing means is selectively supplied with either the nonlinear transformed signal from the nonlinear transforming means or the digital color signal.

Preferably, the LUT transforming means is selectively supplied with either the nonlinear transformed signal from the nonlinear transforming means or the digital color signal.

Preferably, the weight coordinating means determines a sum of the two weight coefficients including the lightness weight coefficient and the chroma weight coefficient and performs limiting such that the coordinated weight coefficient takes a value within a specified range.

Preferably, the weight coordinating means determines a product of the two weight coefficients including the lightness weight coefficient and the chroma weight coefficient and performs limiting such that the coordinated weight coefficient takes a value within a specified range.

DETAILED DESCRIPTION OF THE INVENTION

The image processing method and apparatus of the present invention are hereunder described in detail with reference to the preferred embodiments shown in the accompanying drawings.

Figure 1:
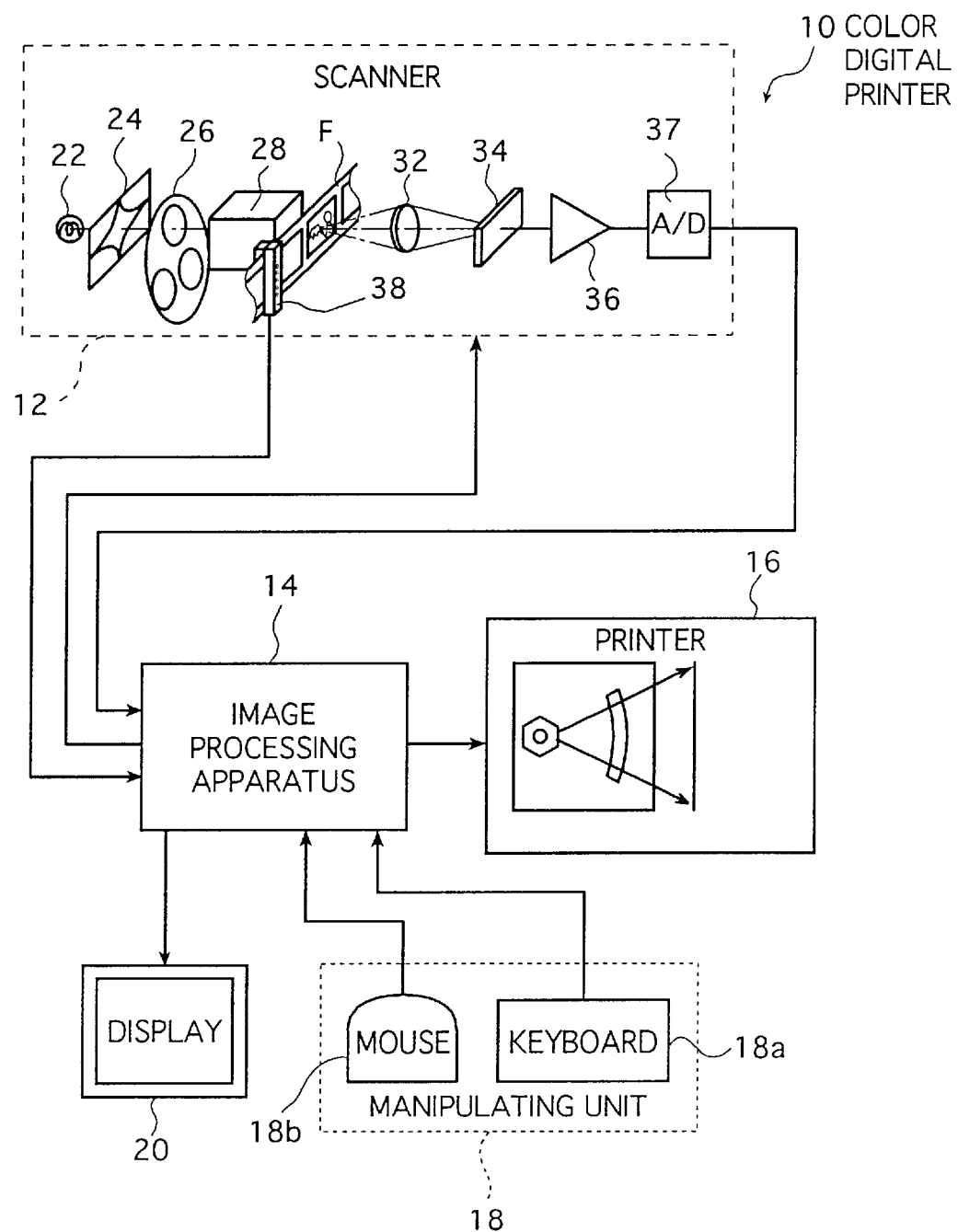
FIG. 1 is a block diagram showing the general layout of a color digital printer including an image processing apparatus according to an embodiment of the invention.

FIG. 1 is a block diagram showing the general layout of a color digital printer including an image processing apparatus according to an embodiment of the invention.

The color digital printer indicated by 10 in FIG. 1 comprises a film reading apparatus (scanner) 12 that reads photoelectrically the image on a film (color negative film) F, an image processing apparatus 14 that performs image processing on the thus read image data (image information) and with which the color digital printer 10 as a whole according to the embodiment under consideration is manipulated and controlled, and a printer 16 which performs imagewise exposure of a light-sensitive material (photographic paper) with light beams modulated in accordance with the image data delivered from the image processing apparatus 14 and which performs development and other necessary processing to produce a finished print (photograph).

Connected to the image processing apparatus 14 are a manipulating unit 18 having a keyboard 18a and a mouse 18b for inputting (setting) various conditions, selecting and commanding a specific processing scheme and entering a command and so forth for effecting color/density correction, as well as a display 20 for representing the image captured with the scanner 12, various manipulative commands and pictures for setting and registering various conditions.

The above-mentioned scanner 12 is an apparatus with which the images recorded on the film F are read photoelectrically frame by frame. It comprises a light source 22, a variable diaphragm 24, a color filter assembly 26 that has three color (R,G,B) filters for separating the image into three primary colors R (red), G (green) and B (blue) and which rotates to have either one of these color filters inserted into the optical path, a diffuser box 28 which diffuses the reading light incident on the film F so that it becomes uniform across the plane of the film F, an imaging lens unit 32, a CCD sensor 34 which reads the image in one frame of the film, an amplifier 36, an analog/digital (A/D) converter 37 and a bar code reader 38 that optically reads DX codes recorded on the edges of the film F.

In the illustrated color digital printer 10, dedicated carriers are available that can be loaded into the body of the scanner 12 in accordance with the type or the size of the film used (e.g. whether it is a negative or reversal film of 240 or 135 size), the format of the film (e.g. whether it is a strip or a slide), the kind of treatment to be done (e.g. whether it is trimming) or other factor. By interchanging carriers, the color digital printer 10 can be adapted to process various kinds of films in various modes. The images (frames) that are recorded on the film F and which are subjected to the necessary procedure for print production are transported and held in a specified reading position by means of the carrier.

The bar code reader 38 is provided on the carrier on the side upstream of the specified reading position as seen in the direction of film transport. It reads DX codes optically as the film F is transported to the specified reading position. If the film F is of 240 size, the bar code reader 38 also reads magnetic information from magnetic tracks.

Figure 2A:
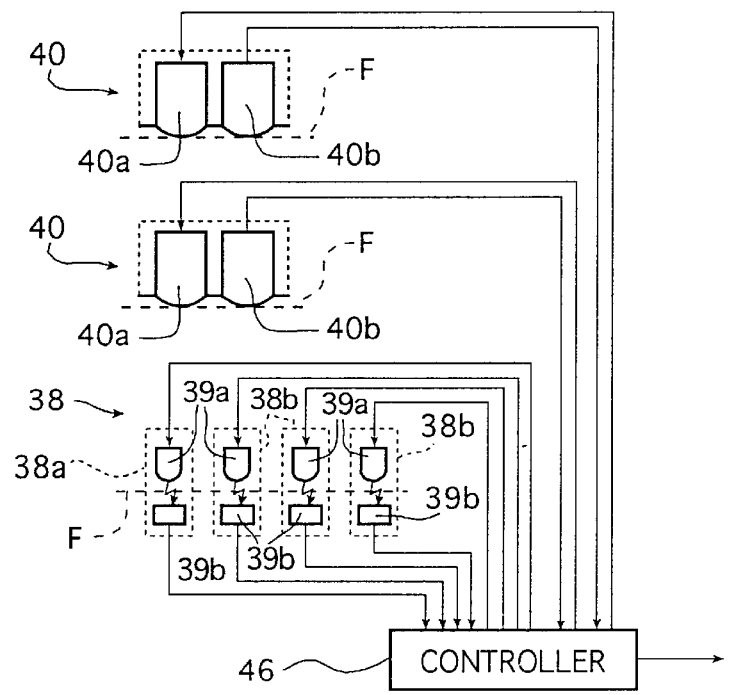
FIG. 2A is an illustration of embodiments of a bar code reader and magnetic heads used in a scanner shown in FIG. 1.
Figure 2B:
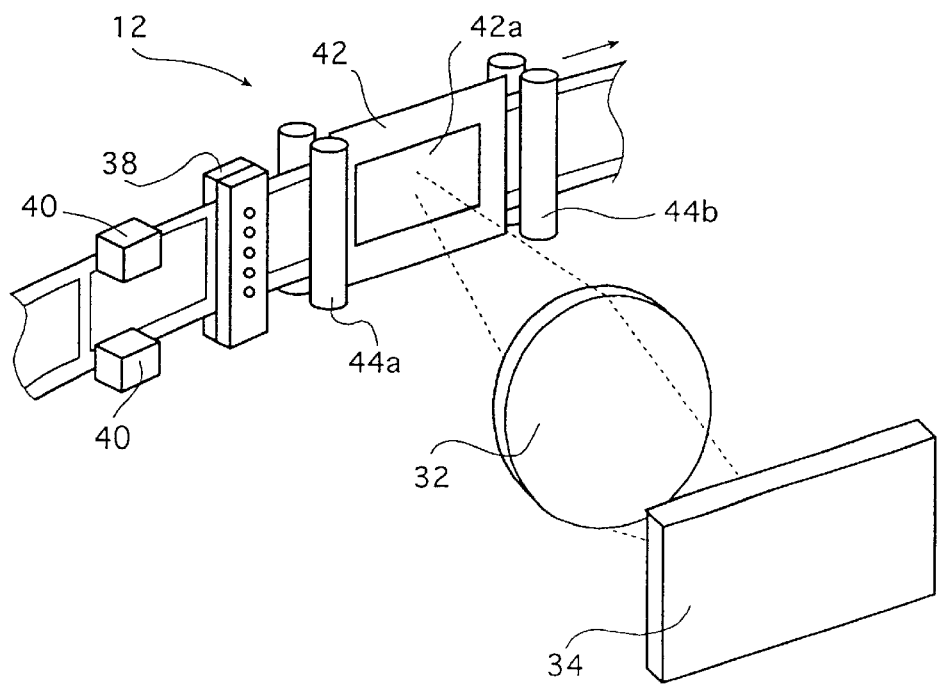
FIG. 2B is a perspective view showing diagrammatically an embodiment of the essential part of the scanner.

FIGS. 2A and 2B show details of the arrangement of the scanner 12 and the bar code reader 38 which is provided on the scanner 12 in the color digital printer 10 according to the embodiment under consideration.

The film F is transported intermittently by means of two transport roller pairs 44a and 44b that are provided upstream and downstream, respectively, of a carrier mask 42 as seen in the direction of film transport. The carrier mask 42 has an opening 42a that determines the reading position and size of the film F. The bar code reader 38 has one optical sensor 38a serving as a bar code reader head and a plurality of other optical sensors 38b; these optical sensors are arranged across the transport width of the film F near the upstream side of the transport roller pair 44a which is provided upstream of the carrier mask 42 as seen in the direction of film transport. Each of the optical sensors 38a and 38b consists of one light emitting portion 39a and one light receiving portion 39b that are spaced by the film F (indicated by a dashed line in FIG. 2A) which is transported in the film transport path.

The optical sensor 38a is provided at an end of the width of the film F and used to read optical information such as DX codes; it is adapted to detect not only perforation holes P in the film F but also its leading and trailing edges. The optical sensors 38b are provided in a face-to-face relationship with the middle of the width of the film F and used to detect the picture (image) area GA of each of the images recorded on the film F and the non-picture area between picture areas, or so-called frames. Briefly, the optical sensors 38b are used to assist in automatic transport of the film F and continuous transport and reading of more than one frame using line sensors to be described later in this specification.

The magnetic heads 40 are provided on a carrier that is compatible with a 240 film F. As shown in FIG. 2B, they are provided in a face-to-face relationship with magnetic tracks MT on both lateral edges of the film F in positions upstream of the bar code reader 38. Each magnetic head 40 comprises a record head 40a for recording magnetic information on the magnetic tracks MT and a read head 40b for reading the magnetic information recorded on the magnetic tracks MT.

The bar code reader 38 and magnetic heads 40 having the structures described above are connected to a controller 46 provided in the scanner 12. The controller 46 is also connected to motors (not shown) for driving the transport roller pairs 44a and 44b on the carrier, various sensors (not shown) and solenoids (not shown) for opening or closing the mask (film holder) 42. As the film F is transported or successive frames are fed by means of the transport roller pairs 44a and 44b under the control of the controller 46, the bar code reader 38 reads optical information such as DX codes from the film F. At the same time, the record head 40a in each magnetic head 40 records the magnetic information from the controller 46 on the magnetic tracks MT of the film F as it receives information from the image processing apparatus 14 whereas the read head 40b of each magnetic head 40 reads the magnetic information recorded on the film F.

The thus read optical and magnetic information are sent to the image processing apparatus 14 via the controller 46. The DX codes as read with the bar code reader 38 are digitized or encoded with the controller 46 and then sent to the image processing apparatus 14 where they are acquired as optical information indicating the type of the film used and the name of its manufacturer.

The reading of optical information with the bar code reader 38 and the acquisition of magnetic information with the magnetic heads 40 are preferably performed as the film is transported or successive frames are fed during prescan for coarse reading of the image on the film F. However, this is not the sole case of the invention and optical and magnetic information may be read or acquired during fine scan or, alternatively, they may be read with a separate dedicated machine. It should be noted that if a bar code reader is to be used, the bar codes and the image in one frame of the film F are not read simultaneously but the bar codes in a frame and the image in a different frame are read simultaneously.

After the optical information (and magnetic information) in a frame of the film F has been read with the bar code reader 38 (and the magnetic heads 40), the image in the same frame is read with the scanner 12. Reading light issued from the light source 22 has its quantity adjusted by the variable diaphragm 24, passes through the color filter assembly 26 to be adjusted in color and is diffused by passage through the diffuser box 28. The reading light is then incident on a frame of the film F held in the specified reading position by the carrier (and which is hereunder typified by a 135 film) and transmitted through the frame to produce projected light bearing the image in the frame as recorded on the film F.

The projected light from the film F is focused by the imaging lens unit 32 to form a sharp image on the light-receiving plane of the CCD sensor 34. After photoelectric reading of the image with the CCD sensor 34, the output signals from the CCD sensor 34 are amplified with the amplifier 36, converted to digital form in A/D converter 37 and sent to the image processing apparatus 14. The CCD sensor 34 is typically an area CCD sensor having 1380×920 pixels.

In the scanner 12, such image reading is performed three times, with the respective color filters in the color filter assembly 26 being inserted in succession so that the image in one frame is read as separations of three primary colors R, G and B.

In the color digital printer 10 of the embodiment under consideration, image reading (fine scan) for outputting a print P is preceded by prescan which reads the image at low resolution for determining the image processing conditions and so forth. Therefore, a total of six image reading processes are performed for one frame.

In the embodiment under consideration, the scanner 12 uses an area CCD sensor and reads the image as separations of three primary colors of the projected light that are obtained by the color filter assembly 26. This is not the sole case of the scanner that can be used in the invention and a scanner indicated by 50 in FIG. 3A may be substituted; it uses a three-line CCD sensor assembly 48 (consisting of three line sensors 48R, 48G and 48B) that are adapted for reading the three primary colors R, G and B and performs image reading by slit scan which reads the images on the film F as it is transported for scan by means of the transport roller pairs 44a and 44b on the carrier. Since the scanner 50 is capable of simultaneous reading of three colors R, G and B, each of prescan and fine scan need be performed only once and regardless of the type of the film F (e.g. whether it is a piece or strip of 135 size film or a 240 size film within a cartridge), the image reading process can be simplified by reciprocal movements. Prescan may be performed by reading all frames in succession.

Figure 3A:
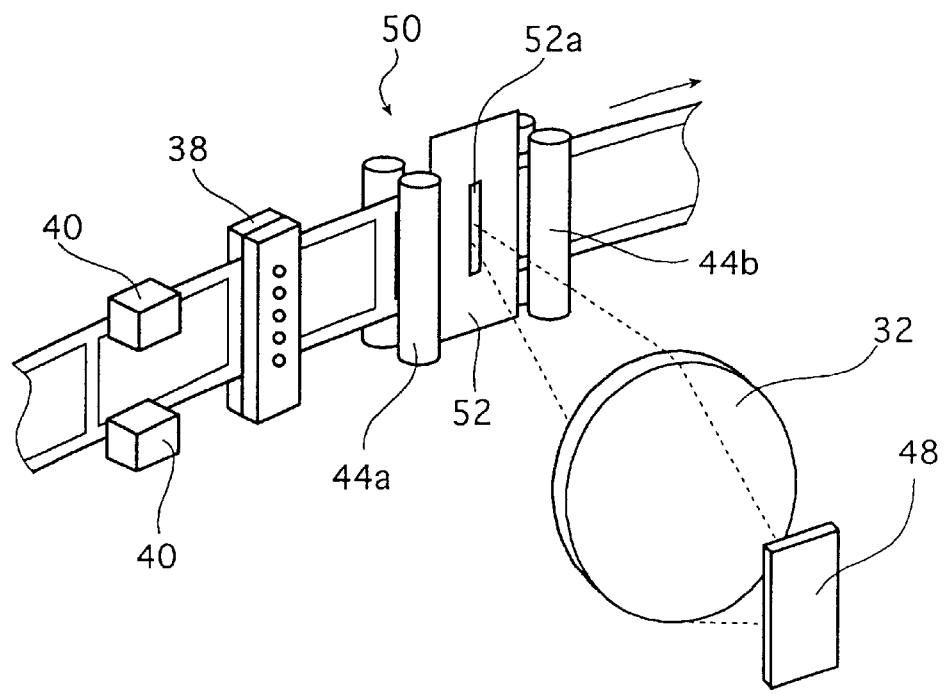
FIG. 3A is a perspective view showing diagrammatically another embodiment of the essential part of the scanner shown in FIG. 1.
Figure 3B:
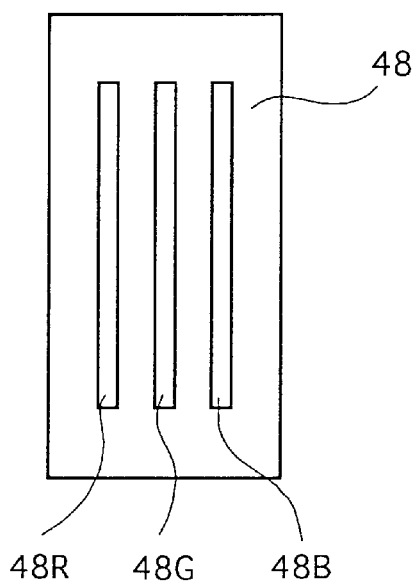
FIG. 3B is a plan view showing diagrammatically an embodiment of a line CCD sensor assembly.

The scanner 50 shown in FIG. 3A has essentially the same structure as the scanner 12 shown in FIGS. 1 and 2A and need not be described in detail. Suffice it here to say that the scanner 50 which performs image reading by slit scan substitutes a slit plate 52 (which may be the top cover of the carrier) having an elongated slit 52a for the film holder (mask) 32 and uses the line CCD sensor assembly 48 in place of the area CCD sensor 34; the color separating filter 26 is replaced by a light adjusting filter (not shown) with which the quantity of the light issuing from the light source 22 is adjusted for each color component.

The line CCD sensor assembly 48 is a three-line reading sensor which performs simultaneous reading of three primary colors R, G and B as separations of the projected light from the film F and has three line sensors 48R, 48G and 48B for reading R, G and B lights, respectively. Each line sensor is a CCD array arranged in one line the same number of CCD elements that correspond to the same number of reading pixels. On the three CCD arrays, R, G and B filters are superposed to construct the line sensors 48R, 48G and 48B, respectively.

The color digital printer 10 of the embodiment under consideration is supplied with the image data for the image processing apparatus 14 from the scanner 12 that performs photoelectric reading of the image recorded on films such as negatives and reversals. However, the scanners 12 and 50 are not the sole examples of the source of supplying image data to the image processing apparatus 14 and various kinds of image reading apparatuses, imaging devices and image data storage devices may be employed, as exemplified by an image reading apparatus that reds the image on a reflection original, a digital camera or a digital video camera, communication devices such as a local area network (LAN) and a computer communication network (an on-line service network), and storage media such as memory cards and MO (magneto-optical) media.

As already mentioned, the output signals (image data) from the scanner 12 are fed into the image processing apparatus 14.

Figure 4:
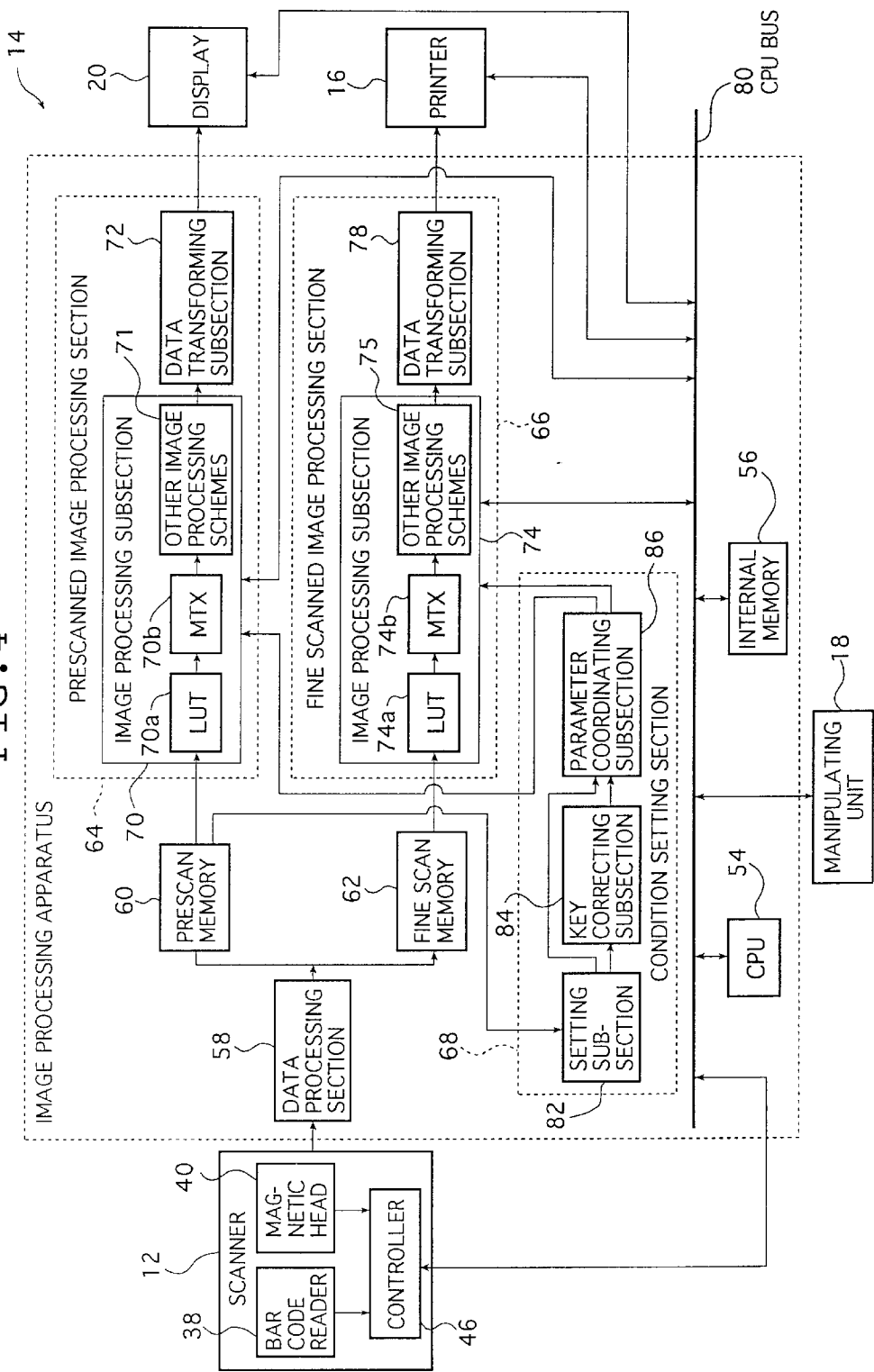
FIG. 4 is a block diagram for an embodiment of an image processing apparatus shown in FIG. 1.

FIG. 4 is a block diagram for the image processing apparatus 14 (which is hereunder referred to simply as "processing apparatus 14"). The processing apparatus 14 generally comprises a control line and an image processing line. The control line has a CPU 54 that implements and controls the image processing method of the invention and which also controls and manages, both partly and wholly, the color digital printer 10 including the scanner 12, processing apparatus 14, printer 16 and display 20, as well as an internal memory 56 for storing the information necessary to implement the image processing method of the invention and operate the color digital printer 10. The image processing line has a data processing section 58, a prescan (frame) memory 60, a fine scan (frame) memory 62, a prescanned image processing section 64, a fine scanned image processing section 66 and a condition setting section 68.

The processing apparatus 14 also includes devices for determining the stop-down value of the variable diaphragm 24 and the charge storage time of the CCD sensor 34 during fine scan. In the control line, the manipulating unit 18 and the display 20 are controlled by the CPU 54 and connected to related sites via a CPU bus 80.

In the image processing line, the R, G and B signals outputted from the scanner 12 are sent to the data processing section 58 where they are subjected to various processing schemes such as log conversion, DC offset correction, dark correction and shading correction, whereupon digital image data is obtained. Of the digital image data, prescanned (image) data is stored in the prescan memory 60 and fine scanned (image) data is stored in the fine scan memory 62.

The prescanned data and the fine scanned data are essentially the same data except for resolution (pixel density) and signal level.

The prescanned data stored in the prescan memory 60 is processed in the prescanned image processing section 64 whereas the fine scanned data stored in the fine scan memory 62 is processed in the fine scanned image processing section 66.

The prescanned image processing section 64 comprises an image processing subsection 70 and an image data transforming subsection 72 whereas the fine scanned image processing section 66 comprises an image processing subsection 74 and an image data transforming subsection 78.

In accordance with the image processing conditions set by the condition setting section 68 to be described later, preset image processing conditions are read out of the internal memory 56 by the CPU 54. The image processing subsection 70 in the prescanned image processing section 64 (which is hereunder referred to simply as "processing subsection 70") and the image processing subsection 74 in the fine scanned image processing section 66 (which is hereunder referred to simply as "processing subsection 74") are the sites where the image (image data) as read by the scanner 12 are subjected to specified image processing schemes in accordance with either the image processing conditions read by the CPU 54 or the image processing conditions that are set in the condition setting section 68 to which the conditions read by the CPU 54 have been sent. The two processing subsections 70 and 74 perform essentially the same operations except that the image data to be processed have different pixel densities.

The image processing schemes to be performed in the processing subsections 70 and 74 are generally exemplified by color balance adjustment, contrast correction (toning), lightness correction, dodging (compression/extension of the dynamic range of densities), chroma correction and sharpening. As already mentioned, these schemes are performed by known methods comprising appropriate combinations of arithmetic operations with operation expressions, processing with LUTs, MTX operations, processing with filters and so forth. In the illustrated embodiment, color balance adjustment, lightness correction and contrast correction are performed with LUTs 70a, 74a and chroma correction is performed with MTXs 70b, 74b. Other schemes such as sharpening and dodging are performed in blocks 71 and 75 in accordance with an operator's instruction, image data and so forth.

Figure 5:
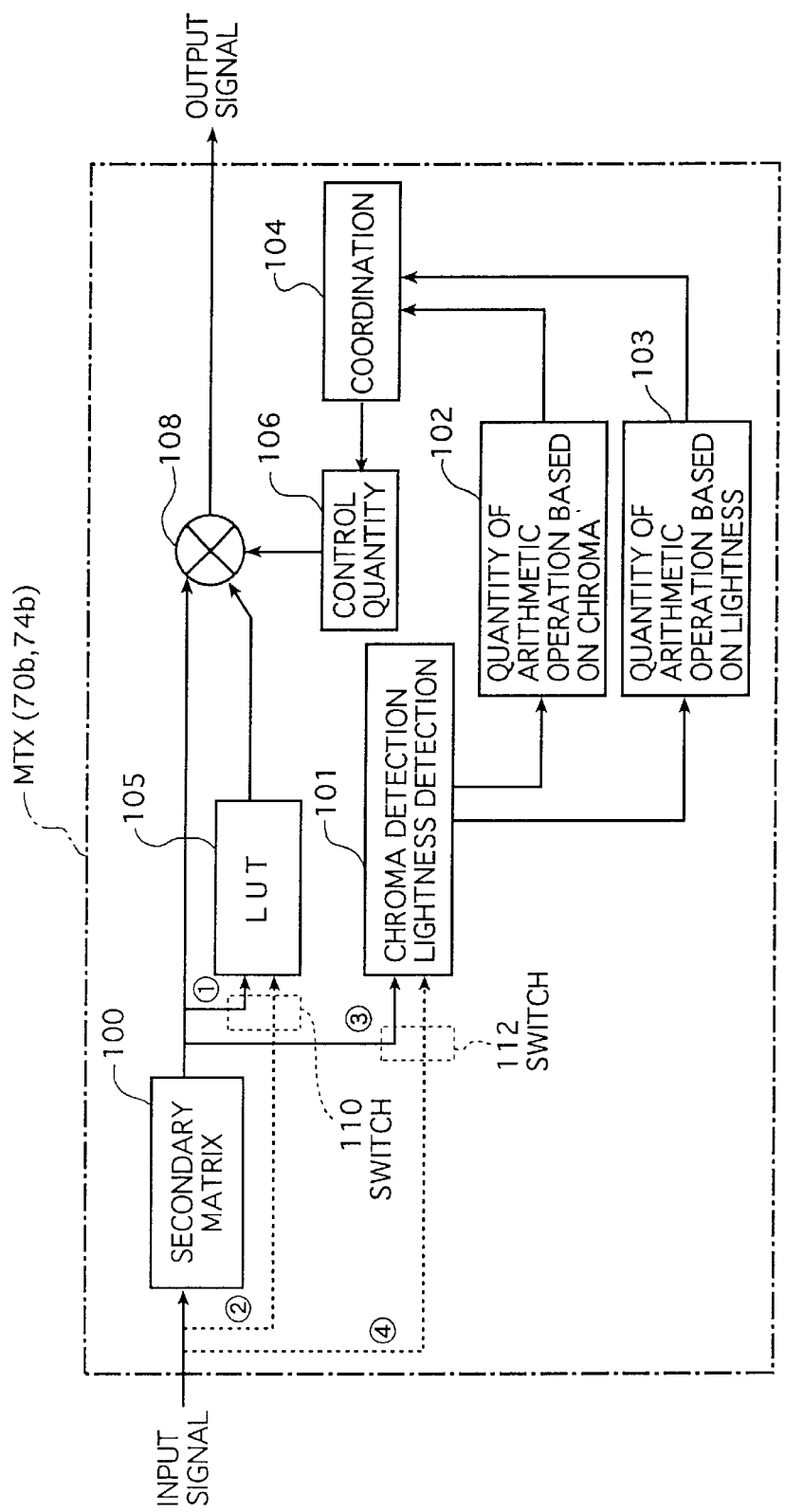
FIG. 5 is a block diagram showing the internal layout of an embodiment of an MTX in a processing subsection shown in FIG. 4.

In the image processing apparatus 14 of the embodiment under consideration, the image processing described above that is to be performed in the processing subsections 70 and 74 is modified such that each of the MTXs 70b, 74b responsible for chroma correction is configured as shown in FIG. 5 to prevent the occurrence of variations in gray signals.

Briefly, the MTXs 70b, 74b used in the embodiment shown in FIG. 5 differ from the conventional MTX configuration in that the output of a secondary matrix (in practice, a 3D-LUT) 100 corresponding to the conventional MTX is connected to a chroma and lightness detecting device 101 for detecting (calculating) the chroma and lightness of color digital input signals which, in turn, is connected to arithmetic devices (chroma and lightness weight computing devices 102 and 103) for computing a chroma weight coefficient and a lightness weight coefficient on the basis of the detected (calculated) chroma and lightness, respectively, and a weight coordinating device 104 for coordinating the quantities of arithmetic operations of the weight coefficients based on the chroma and the lightness. In accordance with the result of coordination (control quantity 106) by the weight coordinating device 104, a weight arithmetic device 108 performs arithmetic operations for weighting the output signal (nonlinear transformed signal) from the MTX 100 and the output signal from a LUT 105 (LUT transformed signal) as described above, thereby synthesizing these output signals.

The secondary matrix (MTX) 100 is equivalent to a conventional secondary matrix (MTX) and expressed as a 3×9 MTX or a 3×10 MTX. If these secondary MTXs are used as such, the volume of arithmetic operations that must be performed is so great that a prolonged time is taken to complete calculations. For faster operation, the secondary MTX is preferably expanded into a three-dimensional look-up table (3D-LUT) as shown in FIG. 5.

The LUT 105 is a data transforming table for performing fine adjustment of grays. This is a device by which the contents of data transformation for fine adjustment of grays, namely, the contents of LUT transformation, are set on the basis of the input signal yet to be processed with the secondary matrix 100 or the nonlinear transformed signal coming from the matrix. The contents of the data transformation table (LUT 105) may include various devices for reducing chroma and be replaced by a selector for outputting only one of R, G, B signals or a primary MTX for chroma reduction, since the LUT 105 may adopt a system for reducing chroma as a function, but not limited to.

The LUT 105 may be adapted to receive either the input signal to MTX 70b or 74b (as indicated by a dashed line) or the nonlinear transformed signal as the output of nonlinear transformation with the secondary MTX 100. This is not the sole case of the invention and a switching device such as a switch 110 indicated by a dashed line in FIG. 5 may be provided on the input side of the LUT 105 so that the nonlinear transformed signal ① or the input signal ② indicated by a dashed line is selectively input to the LUT 105.

The chroma and lightness detecting device 101 detects chroma or lightness by arithmetic operations on the basis of an input signal that is yet to be processed in the secondary matrix 100 or a nonlinear transformed signal which has been processed therein. Advantageous examples of the chroma Ch include values that are defined by the following equations:

$$Ch = |R-G| + |G-B| + |B-R| \qquad (1)$$

$$Ch = \sqrt{(R-G)^2 + (G-B)^2 + (B-R)^2} \qquad (2)$$

$$Ch = |R-Y| + |G-Y| + |B-Y| \qquad (3)$$

$$Ch = \sqrt{(R-Y)^2 + (G-Y)^2 + (B-Y)^2} \qquad (4)$$

Where $$Y = \frac{R+G+B}{3}$$

Advantageous examples of the lightness Y include values that are defined by the following equations:

$$Y = \frac{R+G+B}{3} \quad (5)$$

$$Y = 0.30R + 0.59G + 0.11B \quad (6)$$

The detecting device 101 calculates chroma Ch by either one of the equations (1)–(4) and calculates lightness Y by either the equation (5) or (6).

The detecting device 101 for chroma Ch and lightness Y may be adapted to receive either the input signal to MTX 70b or 74b (as indicated by a dashed line) or the nonlinear transformed signal as the output of processing with the secondary MTX 100. However, this is not the sole case of the invention and a switching device, for example, a switch 112 may be provided on the input side of the detecting device 101 so that the nonlinear transformed signal ③ or the input signal ④ indicated by a dashed line is selectively input to the detecting device 101.

The chroma weight computing device 102 computes a chroma weight coefficient on the basis of the chroma Ch calculated by the detecting device 101. The lightness weight computing device 103 computes a lightness weight coefficient on the basis of the lightness Y calculated by the detecting device 101. An example of the chroma weight coefficient Kc as calculated by the chroma computing device 102 and an example of the lightness weight coefficient Ky as calculated by the lightness computing device 103 are shown in FIGS. 6 and 7, respectively.

Figure 6:
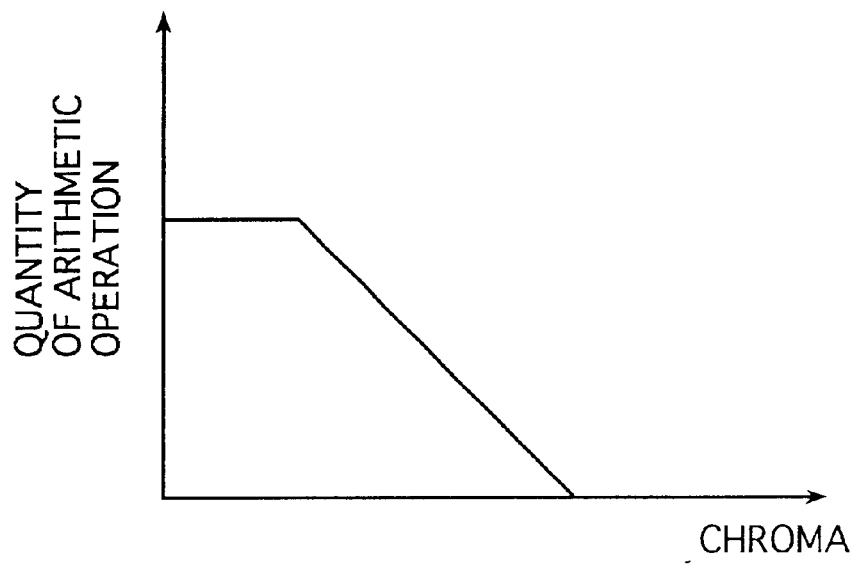
FIG. 6 is a graph showing an example of the chroma weight coefficient (calculated amount based on the chroma) within the MTX shown in FIG. 5.

FIG. 6 shows qualitatively the amount calculated by the chroma weight computing device 102 on the basis of chroma Ch, namely, the result of calculation of the chroma weight (coefficient Kc), specifically, the chroma weight coefficient Kcl to be applied to the LUT transformed signal which is the output from the LUT 105. Obviously, the contribution by LUT 105 (LUT transformed signal) is lowered in the area of high chroma Ch [conversely, the contribution by LUT 105 (LUT transformed signal) is increased in the area of low chroma Ch].

Figure 7:
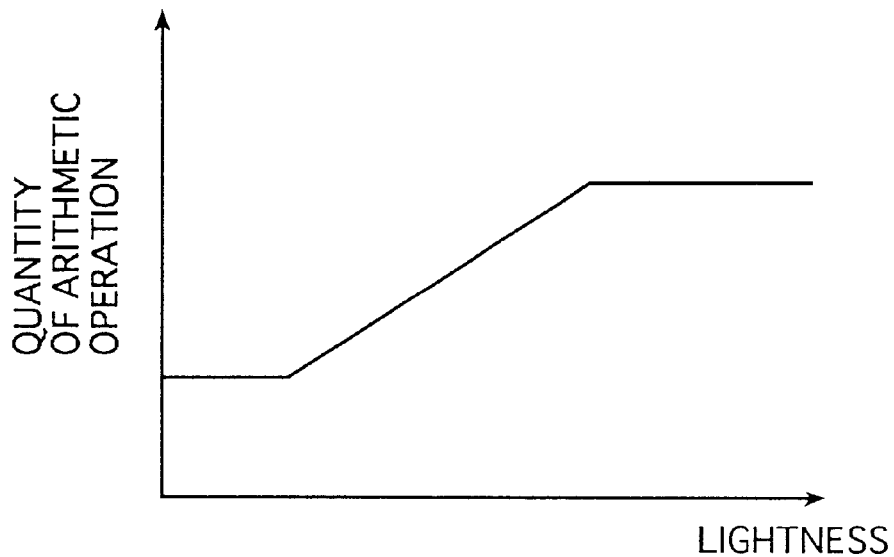
FIG. 7 is a graph showing an example of the lightness weight coefficient (calculated amount based on the lightness) within the MTX shown in FIG. 5.

FIG. 7 shows qualitatively the amount calculated by the lightness weight computing device 103 on the basis of lightness Y, namely, the result of calculation of the lightness weight (coefficient Ky), specifically, the lightness weight coefficient Kyl to be applied to the LUT transformed signal which is the output from the LUT 105. Obviously, the contribution by LUT 105 (LUT transformed signal) is increased in the area of high lightness Y [conversely, the contribution by LUT 105 (LUT transformed signal) is lowered in the area of low lightness Y].

The function of the weight coordinating device 104 is to coordinate the amount (chroma weight coefficient Kc) calculated by the chroma weight computing device 102 on the basis of chroma Ch and the amount (lightness weight coefficient Ky) calculated by the lightness weight computing device 103 on the basis of lightness Y, thereby determining a coordinated weight coefficient Kt. If the chroma weight coefficient Kcl and the lightness weight coefficient Kyl that are to be applied to the LUT transformed signal are used as the chroma weight coefficient Kc and the lightness weight coefficient Ky, the resulting coordinated weight coefficient Kt is Ktl that is to be applied to the LUT transformed signal. However, this is not the sole case of the invention and the weight coefficients to be determined may be Kcm, Kym and Ktm that are to be applied to the nonlinear transformed signal. The weight coordinating device 104 preferably has the additional capability of clipping the result of coordination (coordinated weight coefficient Kt) within a specified range, say, between 0 and 1.

Stated more specifically, the weight coordinating device 104 preferably determines the sum or product of the two weight coefficients, i.e., chroma weight coefficient Kc and lightness weight coefficient Ky, and then performs limiting such that the value of the coordinated weight coefficient Kt lies within a specified range. According to one method of limiting, those values of the coordinated weight coefficient Kt obtained as the sum or product of the two weight coefficients Kc and Ky and which are outside the specified range are fixed at the two opposite ends of that specified range. In another method, a maximum and a minimum value of the coordinated weight coefficient Kt obtained as the sum or product of the two weight coefficients Kc and Ky are multiplied such that they fall at the two opposite ends of the specified range. If desired, both methods may be applied together. These and other known methods may be employed to perform limiting.

On the basis of the result of coordination as determined by the weight coordinating device 104 (i.e., using the coordinated weight coefficient Kt), the control portion 106 determines a weight control index (quantity) by which the nonlinear transformed signal output from the secondary matrix 100 is weighted and another weight control index by which the LUT transformed signal output from the LUT 105 is weighted.

Using the two weight control indices (quantities) based on the coordinated weight coefficient Kt, the weighting arithmetic device 108 performs arithmetic operations for weighting the nonlinear transformed signal from the secondary matrix 100 and the LUT transformed signal from the LUT 105 to calculate the output signal from MTX 70b, 74b.

As the result of these steps, output signals are generated in MTXs 70b and 74b in FIG. 5.

In the MTXs 70b and 74b shown in FIG. 5, the coordinated weight Kt obtained by coordinating the chroma weight coefficient Kc and the lightness weight coefficient Ky as calculated on the basis of the chroma Ch and the lightness Y of the input signal is used by the weighting arithmetic device 108 to perform arithmetic operations for weighting the nonlinear transformed signal from the secondary MTX 100 and the LUT transformed signal from the LUT 105, thereby generating output signals. This is not the sole case of the invention and the coordinated weight Kt may be used by the weighting arithmetic device 108 to perform arithmetic operations for weighting the input signal and the nonlinear transformed signal from the secondary MTX 100, thereby generating output signals. This alternative embodiment is shown in FIG. 8.

Figure 8:
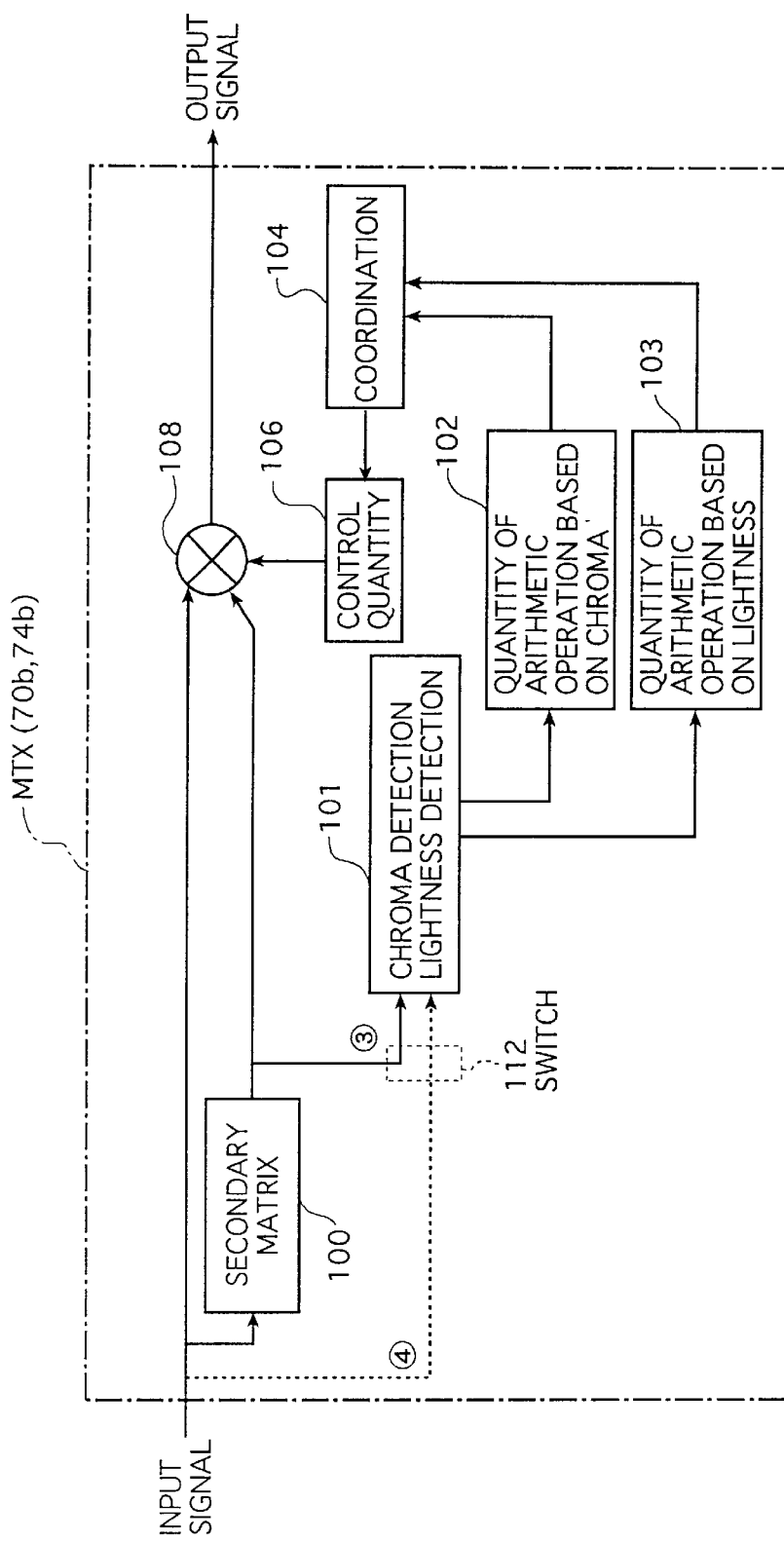
FIG. 8 is a block diagram showing the internal layout of another embodiment of the MTX in the processing subsection shown in FIG. 4.

The MTXs 70b and 74b shown in FIG. 8 have essentially the same configuration as the MTXs 70b and 74b shown in FIG. 5, except that they do not have the LUT 105 (LUT transforming device) and that the weighting arithmetic device 108 performs arithmetic operations for weighting the input signal and the nonlinear transformed signal from the secondary MTX 100. Hence, those components which are identical to the components shown in FIG. 5 are identified by like numerals and need not be described in detail.

Referring to the MTX (70b or 74b) shown in FIG. 8, chroma Ch and lightness Y are calculated by the detecting device 101 and in the chroma weight computing device 102, chroma weight coefficient Kc is calculated on the basis of the chroma Ch as computed by the detecting device 101. Two examples of the chroma weight coefficient Kc as calculated by the chroma weight computing device 102 are shown in FIG. 9.

Figure 9:
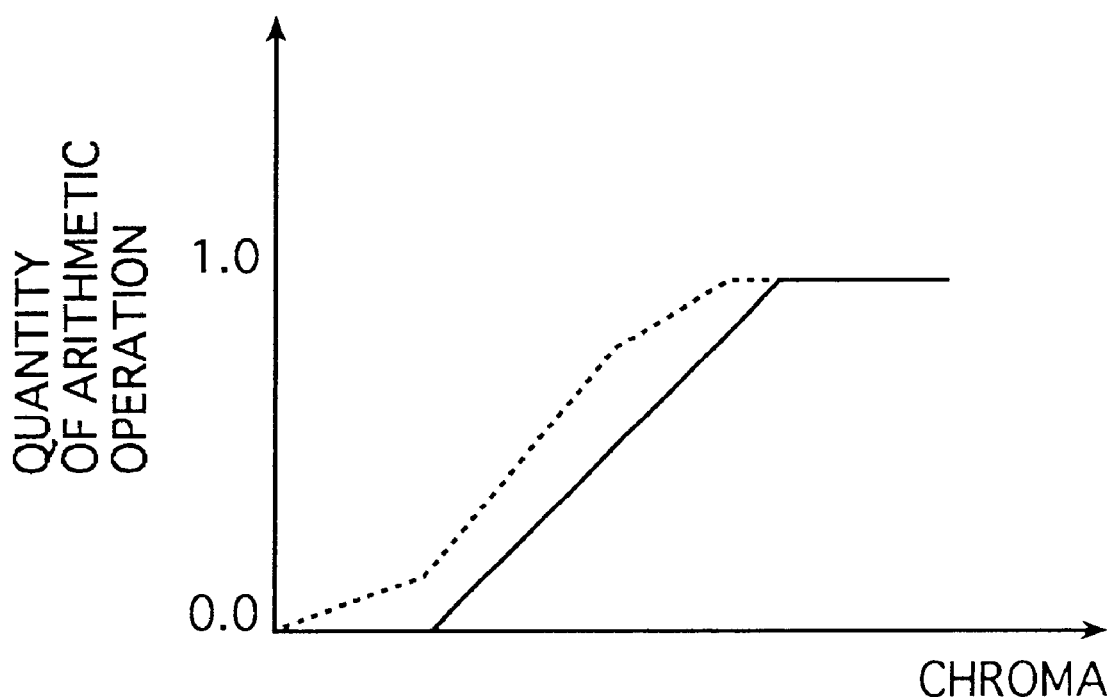
FIG. 9 is a graph showing an example of the chroma weight coefficient (calculated amount based on the chroma) within the MTX shown in FIG. 8.

FIG. 9 shows qualitatively the chroma weight coefficient Kcm, or the amount calculated by the chroma weight computing device 102 on the basis of chroma Ch through arithmetic operations on the nonlinear transformed signal from the secondary MTX 100. While two curves of chroma weight coefficient (the amount being calculated) are shown in FIG. 9, one by a solid line and the other by a dashed line, it is obvious that the contribution by the secondary MTX 100 (outputting the nonlinear transformed signal) is lowered in the area of low chroma Ch whereas the contribution is increased in the area of high chroma Ch. Compared at a given value of chroma Ch that is not very high, the contribution by the secondary MTX 100 (outputting the nonlinear transformed signal) is higher for the dashed curve than for the solid curve.

FIG. 9 does not show the lightness weight coefficient Ky, or the amount being calculated by the lightness weight computing device 103 on the basis of lightness Y but it can be computed in the same manner as described above for the calculation of chroma weight coefficient Kc.

The thus obtained chroma weight coefficient Kc and lightness weight coefficient Ky are coordinated by the weight coordinating device 104 to calculate the coordinated weight coefficient Kt. Using the coordinated weight coefficient Kt, the control portion 106 determines the control indices for performing arithmetic operations to weight the input signal and the nonlinear transformed signal from the secondary MTX 100.

Referencing the table of control indices, the weighting arithmetic device 108 performs arithmetic operations to weight the input signal and the nonlinear transformed signal, thereby generating an output signal from the MTX (70b or 74b).

In each of the cases described above, both chroma Ch and lightness Y are calculated by one detecting device 101. However, this is not the sole case of the invention and chroma Ch and lightness Y may be calculated by different detection devices such as a chroma computing device and a lightness computing device. Speaking of gray variations, they are more affected by chroma Ch than by lightness Y, so the calculation of lightness Y by the detection device 101 may be omitted (hence, the lightness weight computing device 103 and the weight coordinating device 104 are omitted) and neither lightness weight coefficient Ky nor coordinated weight coefficient Kt is calculated but only chroma Ch and chroma weight coefficient Kc are calculated by the detection device 101 and the chroma weight computing device 102, respectively.

The thus generated output signals from the MTXs 70b and 74b are sent to blocks 71 and 75, where not only sharpening and dodging but also image correction in accordance with an operator's instruction and image data is performed.

The image data transforming subsection 72 in the prescanned image processing section 64 is a site where the above-described image data obtained by processing with the processing subsection 70 is transformed with a three-dimensional (3D) LUT or the like into image data that corresponds to the representation on the display 20. The image data transforming subsection 78 in the fine scanned image processing section 66 is a site where the image data obtained by processing with the processing subsection 74 is similarly transformed with a 3D-LUT into output image data that corresponds to image recording with the printer 16, to which it is subsequently supplied.

The various conditions for the processing to be done by the prescanned image processing section 64 and the fine scanned image processing section 66 are set by the condition setting section 68.

The condition setting section 68 comprises an image processing condition setting subsection 82, a key correcting subsection 84 and a parameter coordinating subsection 86.

The image processing condition setting subsection (which is hereunder referred to as "setting subsection") 82 selects the image processing schemes to be performed; in addition, it uses the prescanned data to set the conditions for the image processing schemes to be done in the processing subsections 70 and 74 and supplies them into the parameter coordinating subsection 86.

Specifically, the setting subsection 82 uses the prescanned data to perform various operations including the construction of density histograms and calculation of various image characteristic quantities such as average density, large-area transmission density (LATD), highlights (minimum density) and shadows (maximum density). In addition, in response to an operator's instruction that is optionally entered from the manipulative unit 18, the setting subsection 82 determines image processing conditions as exemplified by the construction of tables (LUTs) for performing gray balance adjustment, lightness correction and contrast correction and the construction of matrix operational formulae for performing chroma correction.

The key correcting subsection 84 calculates the amounts of adjustment of image processing conditions (e.g. the amount of correction of LUTs) typically in accordance with various instructions entered by means of keys on the keyboard 18a for adjusting the lightness, color, contrast, sharpness, chroma and so forth or by the mouse 18b; the key correcting subsection 84 then supplies the calculated amounts of adjustment into the parameter coordinating subsection 86.

After receiving the image processing conditions that have been set by the setting subsection 82, the parameter coordinating subsection 86 sets them in the processing subsection 70 of the prescanned image processing section 64 and in the processing subsection 74 of the fine scanned image processing section 66. Further, in accordance with the amounts of adjustment calculated by the key correcting subsection 84, the parameter coordinating subsection 86 either corrects (adjusts) the image processing conditions set in various parts or makes another setting of image processing conditions.

If, in the scanner 12, DX codes are read with the bar code reader 38 and encoded with the controller 46 or if the projected light from the film F is read and digitized with the CCD sensor and thereafter sent to the image processing apparatus 14, the CPU 54 reads the film type and the corresponding image processing conditions from the memory 56 and supplies them into the parameter coordinating subsection 86 in place of the image processing conditions that are set by the aforementioned setting subsection 82.

In the case just described above, the setting subsection 82 may or may not set image processing conditions. If the image processing conditions that are set in accordance with the information about the film type are to be substituted for the image processing conditions that are set by the setting subsection 82 on the basis of the acquired image data, the first mentioned image processing conditions may be directly supplied into the processing subsection 70 of the prescanned image processing section 64 and the processing subsection 74 of the fine scanned processing section 66 so that they are set in those processing subsections, eliminating the need to set image processing conditions by the condition setting section 68.

We now describe the color digital printer 10 of the embodiment under consideration in greater detail by explaining the actions of the image processing apparatus 14.

The operator sets the film F (or the frame to be subjected to image reading) in a specified position on the scanner 12 (or the carrier), completes specified jobs including the entry of the necessary information such as the size of the prints to be prepared, and thereafter keys in a command for starting print preparation. In response to the START command, the scanner 12 starts prescan and, as already mentioned, the image recorded on the film F is captured photoelectrically as R, G and B separations and output to the prescan memory 60.

When the prescanned data is stored in the prescan memory 60, the setting subsection 82 reads it out of the prescan memory 60, constructs density histograms, calculates image characteristic quantities and performs any other necessary operations to set image processing conditions (construct LUTs and MTXs) and send them to the parameter coordinating subsection 86.

In parallel with these steps, the stop-down value of the variable diaphragm 24 and other reading conditions for fine scan are determined and otherwise set so that the scanner 12 is adjusted accordingly. Then, the scanner 12 performs fine scan and the fine scanned data are sequentially transferred for storage in the fine scan memory 62.

Upon receiving the image processing conditions, the parameter coordinating subsection 86 sets them at specified sites (hardware) in the processing subsection 70 of the prescanned image processing section 64 and in the processing subsection 74 of the fine scanned image processing section 66.

Subsequently, the prescanned data is read out of the prescan memory 60, processed in the processing subsection 70 under the already set conditions and transformed in the image data transforming subsection 72 to image data corresponding to the representation on the display 20. The prescanned image that has been thusly subjected to specified processing is represented on the display 20.

In the ordinary process of print preparation, the operator looks at the representation on the display 20, checks (verifies) the image, or the result of the processing and, if necessary, manipulates the aforementioned adjustment keys on the keyboard 18a or the mouse 18b to adjust the color/density, gradation and other features of the image.

The inputs for this adjustment are sent to the key correcting subsection 84 which, in response to the entered inputs for adjustment, calculates the amounts of correction of the image processing conditions and sends them to the parameter coordinating subsection 86. In response to the supplied amounts of correction, the parameter coordinating subsection 86 corrects the LUTs 70a, 74a and MTXs 70b, 74b in the processing subsections 70 and 74 as already described above. The MTXs are used to perform processing which enables consistent color reproduction without gray signal variations characterizing the present invention described above. In response to this corrective measure, or the inputs for adjustment entered by the operator, the image represented on the display 20 also varies.

If the operator concludes that the image being represented on the display 20 is appropriate (verification OK), he or she manipulates the keyboard 18a or the mouse 18b to give a command for print start. As a result, the image processing conditions are finalized and the fine scanned data is read out of the fine scan memory 62 and sent to the fine scanned image processing section 66.

If no image verification is to be performed, the image processing conditions are finalized at the point of time when the parameter coordinating subsection 86 ends setting of the image processing conditions in the processing subsection 74 of the fine scanned image processing section 66; the fine scanned data is then read out of the fine scan memory 62 and sent to the fine scanned image processing section 66.

Whether verification should be performed or not is preferably determined by selection of operative modes and so forth.

When the image data has been thusly read by the fine scanned image processing section 66, it is processed as described above in the LUT 74a and MTX 74b in the processing subsection 74 and subjected to other known necessary image processing schemes in the processing portion of the block 75; thereafter, the image data is sent to the image data transforming subsection 78, where it is transformed to image data that is suitable for image recording by the printer 16 to which it is then sent.

The printer 16 exposes a light-sensitive material (photographic paper) in accordance with the image data to record a latent image and develops and performs other treatments suitable for the light-sensitive material to output it as a (finished) print. To give one example of the printer's operation, the light-sensitive material is cut to a specified length in accordance with the size of the final print; thereafter, the printer records a back print and three light beams for exposure to R, G and B that are determined by the spectral sensitivity characteristics of the light-sensitive material are modulated in accordance with the image data (the image to be recorded); the three modulated light beams are deflected in the main scanning direction while, at the same time, the light-sensitive material is transported in the auxiliary scanning direction perpendicular to the main scanning direction so as to record a latent image; the latent image bearing light-sensitive material is subjected to a specified wet development process comprising color development, bleach-fixing and rinsing; the thus processed light-sensitive material is dried to produce a finished print; a plurality of prints thus produced are sorted and stacked.

While one embodiment of the present invention has been described above, it should be noted that the invention is by no means limited to that embodiment only and various improvements and modifications may of course be made without departing from the scope and spirit of the invention. One modification relates to the image data to be input to the image processing apparatus of the invention and besides inputting the image as read photoelectrically from a photographic film, input image data from a digital camera and various other digital data supply sources may be used.

As described above in detail, the present invention provides an image processing method and apparatus in which secondary matrix operations are performed on the color reproduction area taken as a whole but in which the secondary matrix operations are not performed or LUT operations are performed on "gray" taken as a separate entity, thereby ensuring the desired color reproduction can be performed consistently without causing subtle variations in "gray" signals.

What is claimed is:

1. An image processing method, comprising the steps of:
   performing nonlinear transformation on a digital color signal to obtain a nonlinear transformed signal;

computing a chroma of said digital color signal from said digital color signal or said nonlinear transformed signal;

computing a chroma weight coefficient based on the computed chroma; and performing arithmetic operations for weighting said nonlinear transformed signal and said digital color signal with said chroma weight coefficient, thereby obtaining an output signal.

2. The image processing method according to claim 1, further including the steps of:

computing a lightness of said digital color signal from said digital color signal or said nonlinear transformed signal;

computing a lightness weight coefficient based on the computed lightness;

combining said lightness weight coefficient and said chroma weight coefficient to compute a single coordinated weight coefficient; and performing arithmetic operations for weighting said nonlinear transformed signal and said digital color signal with said coordinated weight coefficient, thereby obtaining the output signal.

3. The image processing method according to claim 2, wherein, in order to determine said coordinated weight coefficient, a sum or product of the two weight coefficients including said lightness weight coefficient and said chroma weight coefficient is computed and limiting is performed such that said coordinated weight coefficient takes a value within a specified range.

4. The image processing method according to claim 1, wherein said nonlinear transformation is a secondary matrix or a three-dimensional LUT.

5. An image processing method, comprising the steps of:

performing nonlinear transformation on a digital color signal to obtain a nonlinear transformed signal;

performing LUT transformation on said digital color signal or said nonlinear transformed signal to obtain a LUT transformed signal;

computing a chroma of said digital color signal from said digital color signal or said nonlinear transformed signal;

computing a chroma weight coefficient based on the computed chroma; and performing arithmetic operations for weighting said nonlinear transformed signal and said LUT transformed signal with said chroma weight coefficient, thereby obtaining an output signal.

6. The image processing method according to claim 5, further including the steps of:

computing a lightness of said digital color signal from said digital color signal or said nonlinear transformed signal;

computing a lightness weight coefficient based on the computed lightness;

combining said lightness weight coefficient and said chroma weight coefficient to compute a single coordinated weight coefficient; and performing arithmetic operations for weighting said nonlinear transformed signal and said LUT transformed signal with said coordinated weight coefficient, thereby obtaining the output signal.

7. The image processing method according to claim 6, wherein, in order to determine said coordinated weight coefficient, a sum or product of the two weight coefficients including said lightness weight coefficient and said chroma weight coefficient is computed and limiting is performed such that said coordinated weight coefficient takes a value within a specified range.

8. The image processing method according to claim 5, wherein said nonlinear transformation is a secondary matrix or a three-dimensional LUT.

9. An image processing apparatus, comprising:

nonlinear transforming means for performing nonlinear transformation on a digital color signal;

chroma computing means for computing a chroma of said digital color signal;

chroma weight computing means for computing a chroma weight coefficient based on the chroma computed by said chroma computing means; and weighting arithmetic means for weighting a nonlinear transformed signal output from said nonlinear transforming means and said digital color signal with said chroma weight coefficient computed by said chroma weight computing means, thereby obtaining an output signal.

10. The image processing apparatus according to claim 9, further including:

lightness computing means for computing a lightness of said digital color signal;

lightness weight computing means for computing a lightness weight coefficient based on the lightness computed by said lightness computing means; and weight coordinating means by which said chroma weight coefficient computed by said chroma weight computing means and said lightness weight coefficient computed by said lightness weight computing means are combined to compute a single coordinated weight coefficient, wherein said weighting arithmetic means performs arithmetic operations for weighting said nonlinear transformed signal output from said nonlinear transforming means and said digital color signal with said coordinated weight coefficient computed by said weight coordinating means.

11. The image processing apparatus according to claim 9, further including:

LUT transforming means for performing LUT transformation on said digital color signal, wherein said weighting arithmetic means performs arithmetic operations for weighting said nonlinear transformed signal output from said nonlinear transforming means and a LUT transformed signal output from said LUT transforming means with said chroma weight coefficient computed by said chroma weight computing means.

12. The image processing apparatus according to claim 11, further including:

lightness computing means for computing a lightness of said digital color signal;

lightness weight computing means for computing a lightness weight coefficient based on the lightness computed by said lightness computing means; and weight coordinating means by which said chroma weight coefficient computed by said chroma weight computing means and said lightness weight coefficient computed by said lightness weight computing means are combined to compute a single coordinated weight coefficient, wherein said weighting arithmetic means performs arithmetic operations for weighting said nonlinear transformed signal output from said nonlinear transforming means and said LUT transformed signal output from said LUT transforming means with said coordinated weight coefficient computed by said weight coordinating means.

13. The image processing apparatus according to claim 9, wherein said nonlinear transforming means is a secondary matrix or a three-dimensional LUT.

14. The image processing apparatus according to claim 9, wherein said chroma computing means is selectively supplied with either said nonlinear transformed signal from said nonlinear transforming means or said digital color signal.

15. The image processing apparatus according to claim 10, wherein said lightness computing means is selectively supplied with either said nonlinear transformed signal from said nonlinear transforming means or said digital color signal.

16. The image processing apparatus according to claim 9, wherein said LUT transforming means is selectively supplied with either said nonlinear transformed signal from said nonlinear transforming means or said digital color signal.

17. The image processing apparatus according to claim 9, wherein said weight coordinating means determines a sum of the two weight coefficients including said lightness weight coefficient and said chroma weight coefficient and performs limiting such that said coordinated weight coefficient takes a value within a specified range.

18. The image processing apparatus according to claim 9, wherein said weight coordinating means determines a product of the two weight coefficients including said lightness weight coefficient and said chroma weight coefficient and performs limiting such that said coordinated weight coefficient takes a value within a specified range.

* * * * *